United States Patent
Kookoothakis

[11] 3,922,152
[45] Nov. 25, 1975

[54] FILTER

[76] Inventor: Nick Kookoothakis, 309 - 39th St., Beaver Falls, Pa. 15010

[22] Filed: Nov. 21, 1973

[21] Appl. No.: 417,945

[52] U.S. Cl. ............ 55/246; 55/255; 55/256; 55/258; 55/259; 55/260; 55/242; 55/323; 55/473; 55/484; 55/485; 55/488; 55/518; 55/DIG. 30; 55/87; 60/310; 60/311; 210/279; 210/283; 210/284; 210/290; 210/336

[51] Int. Cl.² .................................... B01D 47/02

[58] Field of Search ............ 55/220, 233, 234, 244, 55/246, 248, 255, 256, 257, 258, 259, 260, 318, 319, 320, 321, 322, 323, 332, 359, 484, 485, 486, 488, DIG. 30, 417, 316, 512, 98, 518, 471, 473, 87, 487, 178; 210/150, 151, 283, 284, 290, 336, 279; 60/310, 311; 23/288 A

[56] References Cited
UNITED STATES PATENTS

| | | |
|---|---|---|
| 763,325 | 6/1904 | Roche .................... 210/284 X |
| 1,552,866 | 9/1925 | Miller ...................... 55/246 X |
| 1,594,324 | 7/1926 | Payne ........................ 55/256 |
| 1,758,983 | 5/1930 | Seymour ................. 55/473 X |
| 2,474,746 | 6/1949 | Lopez et al. ............ 55/233 X |
| 2,849,295 | 8/1958 | Ruth ........................ 55/257 |
| 2,911,289 | 11/1959 | Forry ....................... 55/255 |
| 3,391,521 | 7/1968 | Pal ........................... 55/256 |
| 3,537,239 | 11/1970 | Dunmire ............... 55/250 X |
| 3,642,259 | 2/1972 | Bowden ................... 60/310 |
| 3,737,515 | 6/1973 | Veloso ..................... 60/310 |

Primary Examiner—Frank W. Lutter
Assistant Examiner—David L. Lacey

[57] ABSTRACT

A series type or parallel type multiple stage fluid filter wherein each stage of the filter includes a tubular coil, a porous filtering media disposed in layers and for filtering gases a cleaning liquid to a level above the porous filtering media through which the gases are passed for treatment. In a modification, means for cleaning the filter without removing it from its mounting are provided.

5 Claims, 6 Drawing Figures

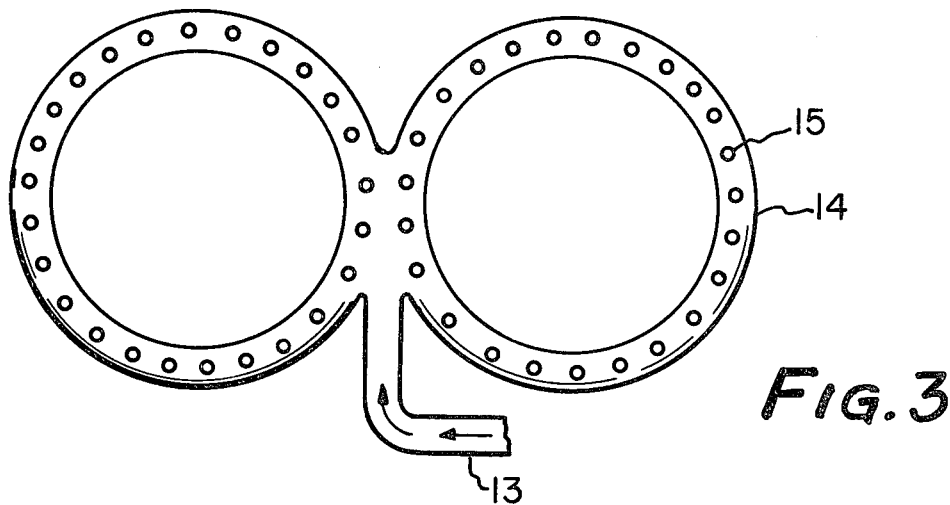
Fig. 3
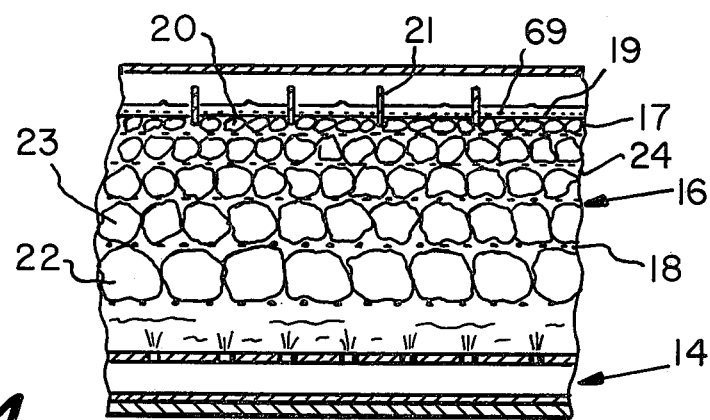
Fig. 4
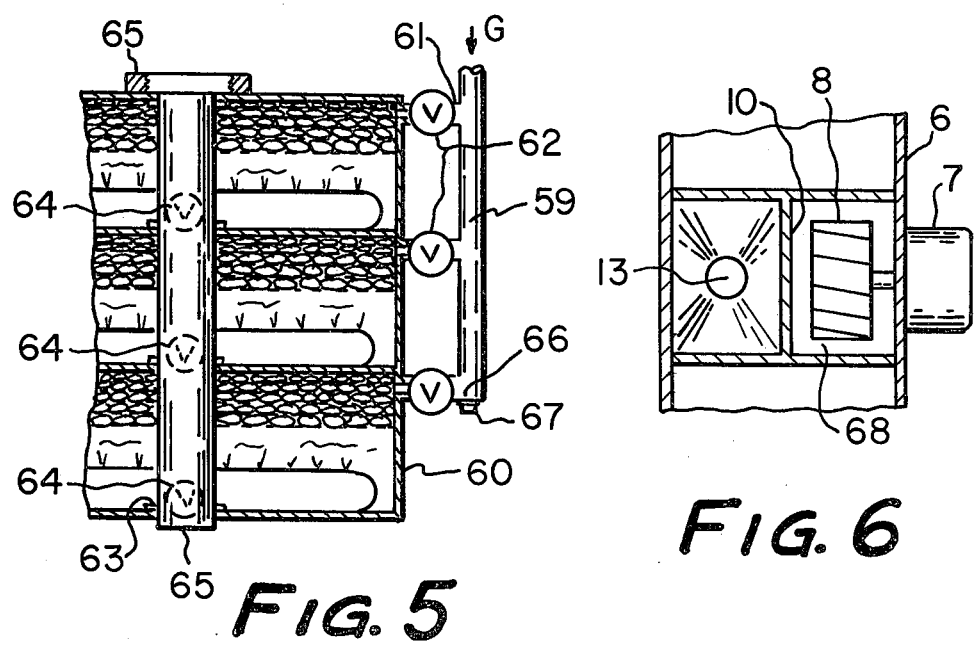
Fig. 5
Fig. 6

FILTER

This invention relates to a filter and particularly to a multiple stage filter for removing pollutants from fluids, especially from exhaust gases. The filter is useful in motor vehicle exhaust systems, in industrial applications, for example filtering stack gases, for water purification and the like.

In the following specification, I have described two embodiments of the invention, namely a series type multiple stage filter and a parallel type multiple stage filter. Since the construction of one stage of each type filter is similar, only one such stage is described in detail.

Of course, many types of filter devices are known including filters embodying plural or multiple stages. By "multiple stages" I mean a plurality of filtering chambers which include substantially the same filtering media and through which fluid to be filtered successively flow. Such plural stage filters are shown, e.g. in U.S. Pat. No. 1,024,204 and U.S. Pat. No. 2,612,745. Various types of filter media have been used in such filters including porous materials (U.S. Pat. No. 1,402,814), alkaline material (U.S. Pat. No. 2,849,295) and limeash submerged in water (U.S. Pat. No. 2,911,289). I believe that water has been treated in separate filters arranged in series with connecting piping.

An advantage of my filter is that through the use of appropriate filtering media (as described hereinafter) in each of the successive stages of a multiple stage filter, improved treatment of fluids is possible. A further advantage of my filter is that it is compact, may have no moving parts, and may be easily cleaned.

My invention is a filter of the series or parallel type having multiple stages including filtering media through which fluid to be treated passes. In the series type filter fluid, such as exhaust gas, enters at an inlet port of the filter, passes a plurality of baffles, is forced under pressure of an engine or at least one pump into a first stage comprising a tubular coil, a cleaning liquid, a porous stone filtering media and preferably but not necessarily a sand filtering media for treatment and successively into additional stages to an outlet port. The exhaust gas may undergo a final treatment at the outlet port comprising a replaceable paper-type filter before being exhausted to atmosphere or returned to the engine as substantially pure hydrocarbon, such as propane.

In the parallel type filter, fluid enters at an inlet port of the filter, and is divided into substantially equal parts, each of which simultaneously passes through successive stages of the filter. Each stage includes filtering media similar to that used in the series type filter. There are two outlet ports in the parallel type filter such that each part of the fluid being treated can be exhausted directly to atmosphere or returned, for example, to the engine at the same time. Each outlet port may also include a replaceable paper-type filter. One or more pumps may be required to force the fluid through either the series type or parallel type filter.

The filter is especially compact and therefore can be used in a restricted area, for example beneath an automobile. It may have either rectangular, circular or other cross section as required by space requirements. The body of the filter may be made of a substantially non-corrosive material, such as stainless steel. The internal baffles and the structure defining the stages of the filter may also be made of substantially non-corrosive materials.

A complete understanding of my invention will be obtained from a consideration of the following description taken in conjunction with the accompanying drawings wherein:

FIG. 3 is a partial plan view of the filter showing the coil or tubing used in the bottom of each stage of the filter;

FIG. 4 is an enlarged view of a section of one stage of the filter showing the disposition of the filtering media in the filter;

FIG. 5 is a partial elevational cross section of a modified filter showing means for cleaning the filter; and FIG. 6 is a partial plan view of an inlet channel into a stage of the filter.

Figure 1:
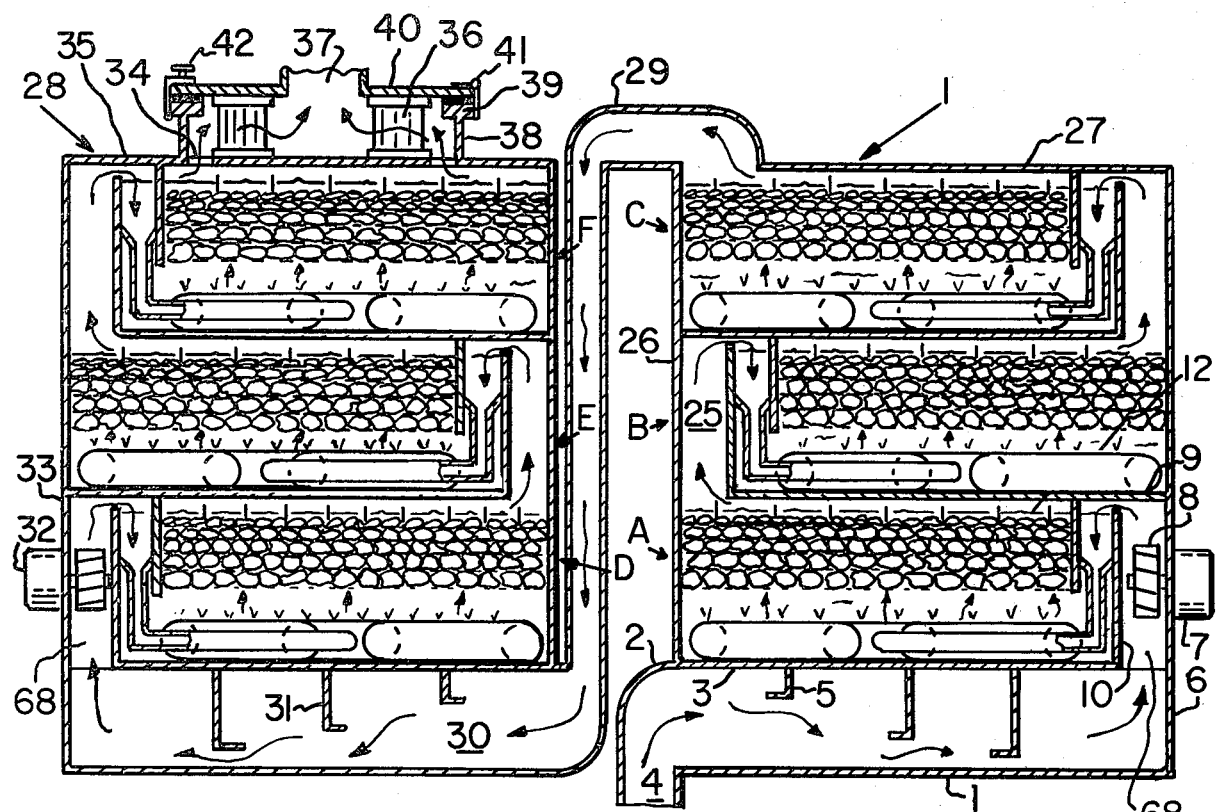
FIG. 1 is a longitudinal cross section of the series type multiple stage exhaust gas filter in accordance with my invention.

Before treatment, exhaust gas contains several major atmospheric contaminants, the most significant being uncombusted hydrocarbons such as methane gas. According to the invention, the exhaust gas is filtered in a series type or parallel type multiple stage filter. The series type filter (FIG. 1) comprises a body 1 having an outer wall 2 and an inner wall 3 forming an inlet port 4 through which exhaust gas from the engine (not shown) enters the filter. Baffles 5 secured to the inner wall 3 direct the flow into the filter and minimize turbulence of the gases. As the gas passes the final baffle it is directed into inlet channel 68 (FIGS. 1 and 6) along an end wall 6 of the filter and forced upwardly, either under the usual pressure of the engine or by a conventional pump 7 mounted on wall 6 and having an impeller 8 which extends into the gas stream.

The gas then reaches the upper wall 9 of the first stage A of the filter, reverses its path around an L-shaped leg 10 of the inner wall 3 and passes into funnel-shaped inlet 13 of tubular coil 14 and then into cleaning liquid 11 which is carried by the first stage.

The cleaning liquid may be water; however, I prefer to use a liquid comprising oil and water with the latter being a limewater to reduce frothing or foaming during operation of the filter. The liquid level 12 of stage A, as in all other stages of the filter, is slightly higher than the level of the highest porous filtering media used in the particular filter stage.

The gas to be treated enters the bottom of stage A of the filter and more precisely enters the inlet 13 of a tubular coil 14 (FIG. 3) which includes a plurality of holes or perforations 15 along the upper side thereof. The coil may be in the so-called "Figure 8" form which I prefer for distributing the gas in each filter stage or in any other suitable configuration. The coil 14 is preferably made of copper or other non-corrosive material.

As the gas rises through the coil and into the liquid media 11, the filtering process continues. The gas next passes into the porous filtering media 16 which preferably comprises a plurality of layers 17 of porous material such as sandstone separated by alternately disposed screens 18 having mesh of decreasing size from the bottom to the top screen. The sandstone also is smaller at the top of each stage than at the bottom. In view of the nature of the porous filtering media, it will be helpful to refer to the enlarged partial section of a filter stage shown in FIG. 4. There, between the upper wall 9 and the lower or inner wall 3 is shown a tubular coil 14 having perforations 15 for passing exhaust gas to be treated to a filtering media 16 comprising a plurality of layers 17 of sandstone separated by screens 18. The top layer may be a layer of sand 19 placed directly on the uppermost (and smallest) sandstone particles 20. The level 12 of the liquid is slightly above the sand 19. Relative stability of the water level is maintained by baffles 21 which are secured to the side and/or end walls of the filter and which extend into the sand 19 and preferably into the layer of particles 20. The baffles 21 are intended to prevent loss of liquid in a stage during excessive vibration or shock to the filter, for example, when used in a motor vehicle. Screen 69 prevents loss of the type layer under similar conditions.

The successive layers 17 of porous material in a single stage are made up of particles of sandstone preferably which decrease in size from the bottom to the top of a filter stage. For example, sandstone particles 22 are approximately 1¼ as large as particles 23 in the next uppermost layer and the particle size decreases in approximately the same proportion with each successive layer. The mesh of the screen 24 separating the sandstone layers also decreases in size from the bottom to the top of each filter stage.

As shown in FIG. 1, once the gas has been treated by both the cleaning liquid and porous filtering media of the first filter stage A, it passes along the upper wall of that stage to a vertical channel 25 formed along an opposite end wall 26 of the filter stage for passage into a successive filter stage B for additional treatment comprising cleaning and removal of contaminants. As is evident from the drawing the exhaust gases enter the second stage at the opposite side thereof from the inlet to the first stage. This makes it possible for the gas to undergo considerably more filtration than if it were passing directly and vertically through successive filter stages. Moreover, it results in a more compact filter than if a different structure were employed.

The second filter stage B is substantially like that of the first filter stage A with regard to the presence of a tubular coil and the cleaning liquid and porous filtering media, other than the reversal of the path through the filter stage relative to the end walls; hence, it need not be described in detail.

After the gas passes through stage B, it may pass through a stage C from the same direction as in stage A and through as many more stages as are required for substantial purification treatment. As shown in FIG. 1, the successive filter stages may be vertically disposed in a first section 27 as are stages A, B, C and a second section 28 comprising stages D, E, and F, with the stages C and D joined by a tubular connection 29 which communicates with a chamber 30 having baffles 31 similar to and for the same function as baffles 5 in the first section. The stages may all be placed in one section. It may be necessary to force the exhaust gas through the stages D, E, and F with a second conventional pump 32 located in an end wall 33 of the filter.

After the exhaust gases have undergone treatment in stages D, E, and F, they pass through the circular opening 34 in the top wall 35 of the filter section 28, through a paper-type filter 36 and then through an outlet port 37 to atmosphere or to a means such as a pipe (not shown) for recycling to the engine.

The circular opening 34 in the top wall is preferably not continuous so that ribs support the portion of the end wall upon which the paper-type filter is disposed.

There is a circular wall 38 surrounding the paper-type filter 36 having a top flange 39. A cover 40 is hinged at 41 to one side of the flange and latched at 42 to the opposite side of the flange. A conventional cover gasket may be used between the flange and the cover to prevent loss of gas. Thus, the paper-type filter can be replaced easily through the cover. If a recycling means is used, it may be a flexible pipe or hose which will enable the cover to be opened and closed for filter replacement.

Figure 2:
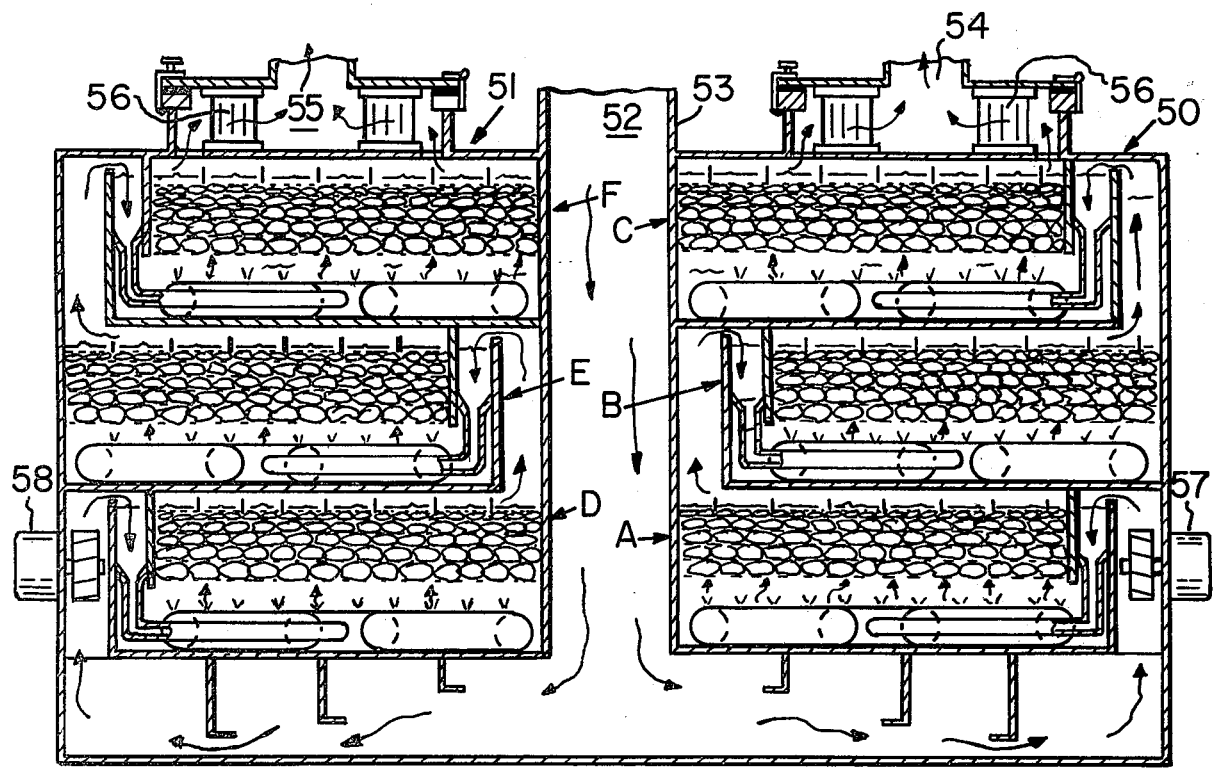
FIG. 2 is a longitudinal cross section of the parallel type exhaust gas filter in accordance with my invention.

The parallel type exhaust filter shown in FIG. 2 includes substantially the same filter components previously described; however, the operation of the filter is quite different. It will be noted that the overall dimensions of both the series type filter and the parallel type filter are substantially the same and, therefore, they may be used in the same environment as required.

Specifically, with respect to the parallel type filter shown in FIG. 2, the filter has two identical filtration sections 50 and 51. Preferably, and as shown, each section includes three filter stages A, B, C and D, E, F, each stage comprising a tubular coil, cleaning liquid and porous filtering media disposed in layers separated by screens, all as described in connection with FIG. 1. In the parallel type filter according to my invention, fluid such as the exhaust gas to be treated enters the filter through a single inlet port 52 and central inlet tube 53 extending within the sections 50 and 51. The gases substantially divide into two parts at the bottom of the filter, one part following the path into section 50 and then successively passing the filter stages A, B, and C and the other part following the path into section 51 and then successively passing the filter stages D, E, F. The exhaust gases exit the sections 50 and 51 through their respective exhaust ports 54 and 55 which may also include paper-type replaceable filters 56 secured by a cover arrangement as earlier described.

To move gases through the filter, it may be necessary to employ one or more conventional pumps, similar to pumps 7, and preferably two such pumpss 57 and 58, one in each of the filter sections are employed.

Either the series or the parallel type multiple stage filter will effectively remove substantially all contaminants from exhaust gases for return to the atmosphere without pollution or for recycling for reuse. However, the contaminants are retained in the cleaning liquid, in the porous filtering media and on the various components of the filter structure. A further advantage of my filter is the provision of means for cleaning the filter without removing it from its environment, for example, in the exhaust line of a motor vehicle. A preferred filter cleaning arrangement is shown in FIG. 5 and this modification can be employed in either the series type or parallel type filter according to the invention.

In the modification, a single pipe 59 extends along a sidewall 60 of the filter. A lateral pipe 61 communicates with the top of each stage of the filter through a valve 62 which permits cleaning fluid, such as $CCl_4$, to be passed under pressure into the filters in the direction of the arrow G. There is also a tubular drain tube 63 which is located along another portion of the sidewall 60 and communicates with the bottom of each stage through a laterally extending pipe having check valves 64 which permit fluid to flow out of the stages and into the drain tube 63. Both the top and the bottom of the drain tube are normally closed by threaded caps 65 which are removed for cleaning of the filter. When cleaning is desired, the cleaning solution is forced under high pressure into the filter stage, the cleaning liquid drained with the solution and the porous filtering media back washed to remove contaminants collected therein. When the cleaning operation is complete, the drain tube caps are replaced and the cleaning liquid is replaced through the pipe 59. Hole 66 closed by plug 67 may be used to drain any excess cleaning liquid in the vertical pipe 59 before reuse of the filter.

Either the series type or parallel type filter may be used to filter industrial waste gases. The filter may be mounted in an industrial stack using suitable piping and the filtered gases recycled or exhausted to atmosphere. The operation of the filter for industrial applications is the same as in motor vehicle use; however, the nature of the gases and the pressures being different, appropriate structural materials, cleaning liquid and filtering media are necessary.

Of course, the filter can be used to filter water, oil, or any liquid such as industrial wastes. In this case, the cleaning liquid 11 is eliminated. The liquid must be moved through the filter under pressure.

Having described preferred embodiments of the invention, it may otherwise be embodied within the scope of the appended claims.

I claim:

1. A multiple stage fluid filter comprising:
   A. a filter housing having an inlet port for admitting fluid to be treated into the housing;
   B. a plurality of filter stages within the housing and through which the fluid is adapted to pass under pressure, each filter stage comprising a chamber containing
      a. an inlet channel,
      b. a tubular coil having a funnel-shaped inlet in communication with the inlet channel and having openings through which the fluid is adapted to pass upwardly in the chamber,
      c. a plurality of layers of porous filtering media separated by screens located in the chamber above and spaced from the coil,
      d. a body of cleaning liquid filling the chamber to a liquid level above the uppermost of the layers of porous filtering media,
      e. a plurality of baffles at the top of the chamber above the porous filtering media and extending at least partially into said cleaning liquid for stabilizing the liquid level during vibration of the filter housing; and
   C. an outlet port in the housing in communication with the chamber of the last of the filter stages through which the fluid to be treated passes, the inlet channel of at least one stage being connected to the inlet port of the housing and the balance of the stages being connected to an adjacent filter stage chamber, whereby fluid to be treated can enter the inlet port of the housing; pass into the inlet channel of a first stage; pass into the inlet of a tubular coil therein; pass through the tubular coil and upward through the cleaning liquid and the porous filtering media and into the inlet channel of the next succeeding stage; and then pass through successive stages to the outlet port of the filter housing where it is exhausted from the filter.

2. A multiple stage filter as set forth in claim 1 and having at least one pump positioned in the inlet channel of one stage of the filter which pump has an impeller means for moving the fluid to be treated through the filter in the direction of the outlet port.

3. A filter as set forth in claim 1 in which the cleaning liquid comprises a mixture of oil and limewater.

4. A filter as set forth in claim 1 wherein the porous filtering media comprise a plurality of sandstone particles.

5. A filter as set forth in claim 1 wherein the porous filtering media in each stage comprise a plurality of layers of porous stones of larger size near the bottom of the stage and decreasing in size toward the top of the stage, said layers being separated by screens of larger mesh near the bottom of the stage and decreasing in mesh size toward the top of the stage.

* * * * *